Figure 1:
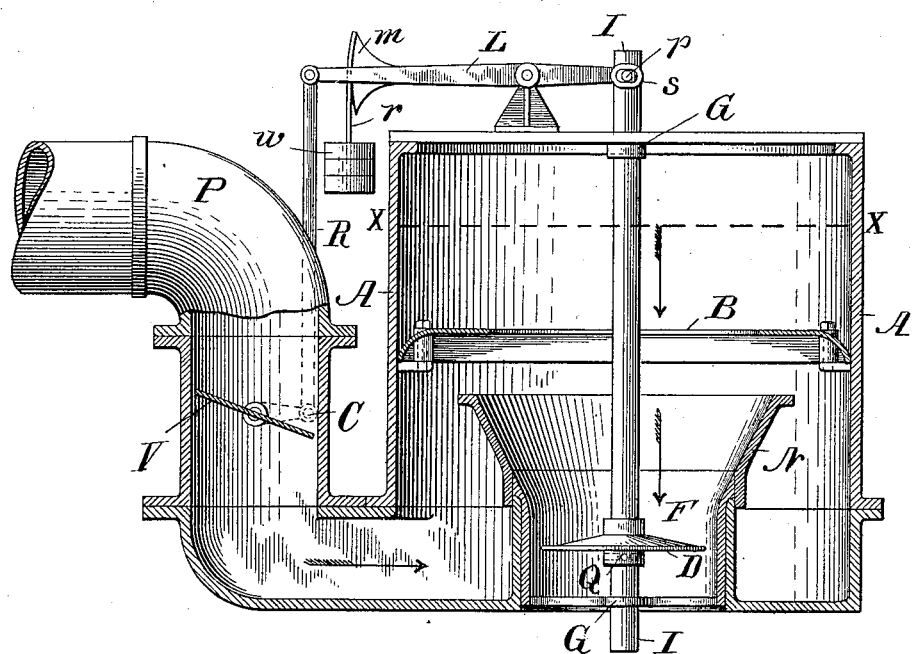

No. 635,828. Patented Oct. 31, 1899.
E. B. WESTON & W. W. JACKSON.
AUTOMATIC REGULATING WEIR.
(Application filed July 29, 1899.)

(No Model.) 3 Sheets—Sheet 1.

No. 635,828. Patented Oct. 31, 1899.
E. B. WESTON & W. W. JACKSON.
AUTOMATIC REGULATING WEIR.
(Application filed July 29, 1899.)
(No Model.) 3 Sheets—Sheet 2.

WITNESSES:
F. N. Roehrich
James C. Reilly

INVENTORS
Edmund B. Weston
Walter W. Jackson
BY
J. E. Hindon Hyde
ATTORNEY

No. 635,828. Patented Oct. 31, 1899.
E. B. WESTON & W. W. JACKSON.
AUTOMATIC REGULATING WEIR.
(Application filed July 29, 1899.)
(No Model.) 3 Sheets—Sheet 3.

WITNESSES:
F. N. Roehrich
James C. Reilly

INVENTORS
Edmund B. Weston
Walter W. Jackson
BY
J. Hindon Hyde
ATTORNEY

UNITED STATES PATENT OFFICE.

EDMUND B. WESTON AND WALTER W. JACKSON, OF PROVIDENCE, RHODE ISLAND, ASSIGNORS TO THE NEW YORK FILTER MANUFACTURING COMPANY, OF NEW YORK, N. Y.

AUTOMATIC REGULATING-WEIR.

SPECIFICATION forming part of Letters Patent No. 635,828, dated October 31, 1899.

Application filed July 29, 1899. Serial No. 725,448. (No model.)

*To all whom it may concern:*

Be it known that we, EDMUND B. WESTON and WALTER W. JACKSON, citizens of the United States, residing in Providence, county of Providence, and State of Rhode Island, have invented an Improvement in Automatic Regulating-Weirs, of which the following is a specification.

The invention relates to an automatic regulating-weir especially designed and adapted among other uses to be employed in connection with mechanical filters both of the gravity and pressure type in order to secure a constant rate of discharge of filtered water from the weir tank or chamber irrespective of the height or pressure of the water column in said weir-tank and irrespective of the condition of the filter-bed. The device may, however, be used in connection with an irrigation plant designed to supply unvarying amounts of water from the source of supply to the various consumers, or, again, to the regulation of the water-flow for power purposes, or, still again, to control the supply of solutions in chemical-manufacturing plants.

It is well known to those skilled in the art that when water first begins to flow through the filter-bed of a filter the bed is easily permeated and the rate of discharge is much greater than can be maintained after the filter-bed has become less permeable through the collection of the coagulant generally used in filter plants or the impurities removed from the water and lying on and within the filtering medium. Practice has determined a limiting velocity or rate of discharge for each unit of area of the surface of the filtering medium, and this rate must not be exceeded if the efficiency of the filter in the removal of bacteria and other impurities is to be maintained. It is not only necessary to place a maximum limit upon the rate of discharge, but it is also very desirable to preserve a constant rate of flow of the fluid, and although variations in this rate may not rise as high as the maximum limit any considerable variation is still very detrimental to the efficiency of the apparatus. Changes of rate cause changes in pressure on the filtering-bed and, however slight, will tend to cause scouring action.

Our invention is designed to obviate the disadvantages referred to and to secure a predetermined constant rate of discharge of filtered fluid from the filtering apparatus whether of the gravity or of the pressure type.

Our invention is illustrated in the accompanying drawings, in which—

Figure 2:
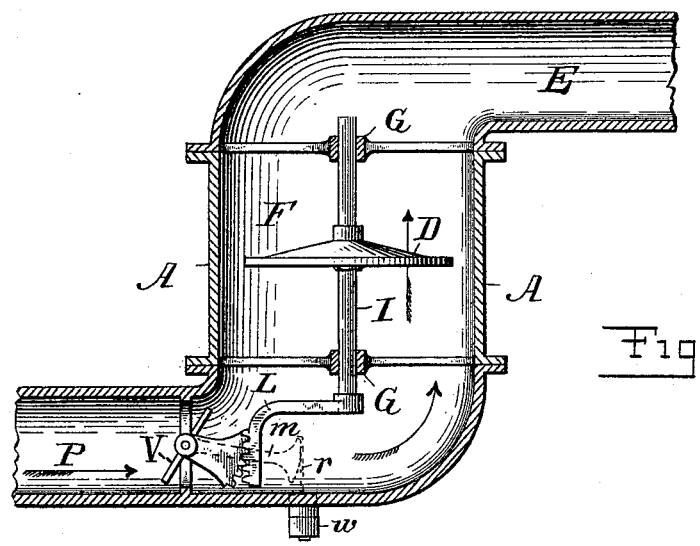
Figure 3:
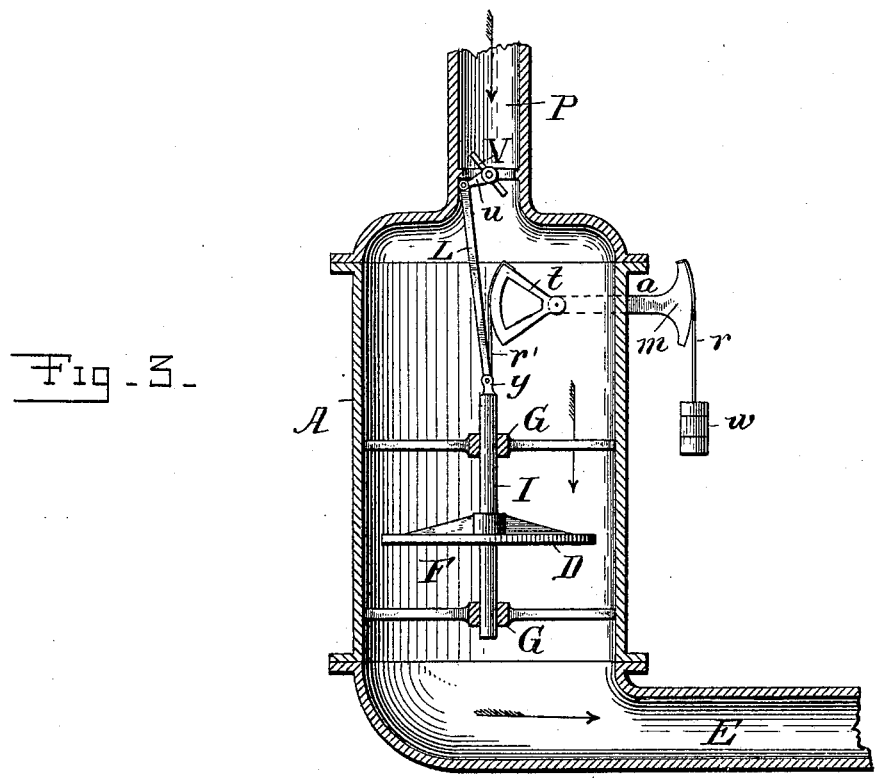
Figure 4:
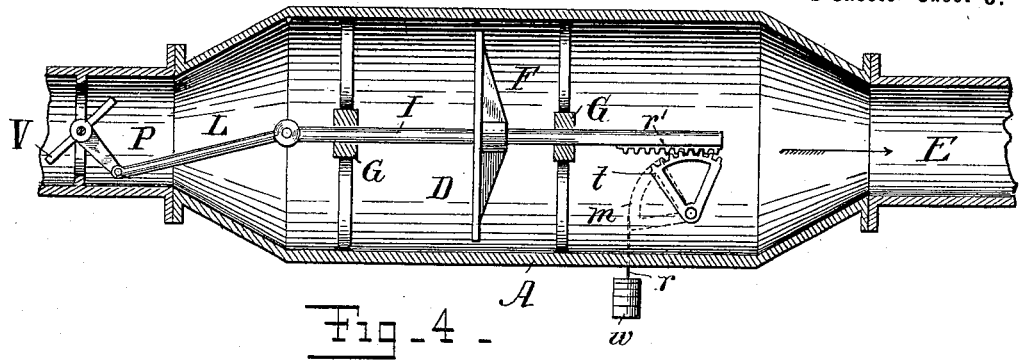
Figure 5:
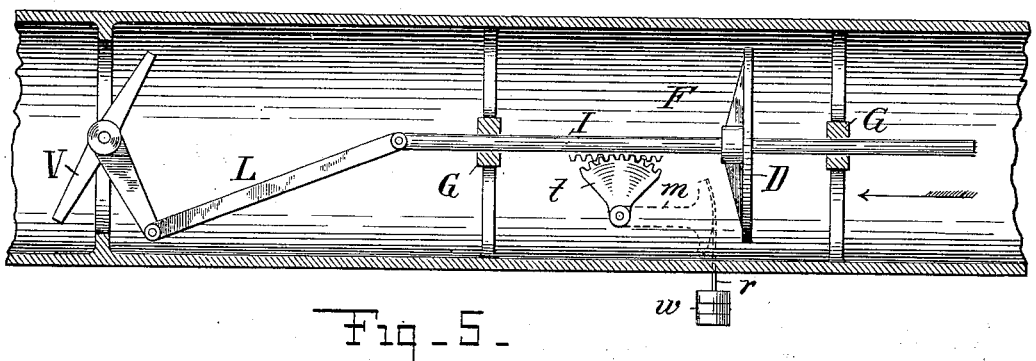
Figure 6:
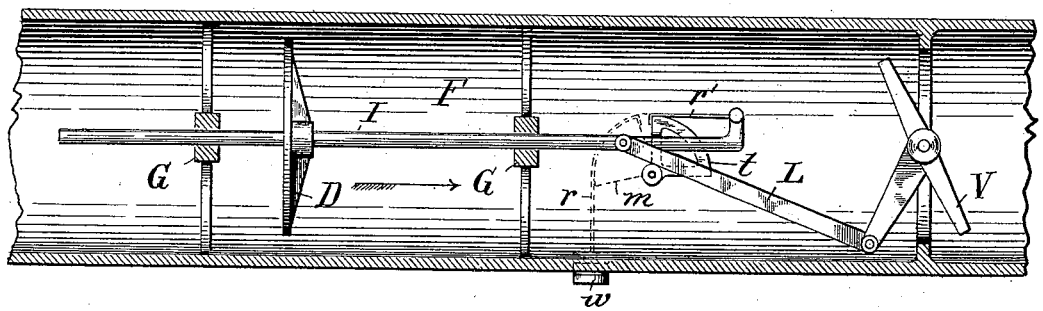

Figure 1 shows, partly in elevation and partly in section, a module through which the water flows by gravity. Fig. 2 shows a module through which the water flows under pressure, and Fig. 3 shows a modified form of module through which the water flows by gravity or by pressure. Figs. 4, 5, and 6 show modifications of modules through which the water flows under pressure.

Similar letters of reference indicate similar parts throughout the several views, the arrows showing the direction of flow.

Referring to the drawings, Fig. 1, P represents the inlet-pipe for the filtered or other water, and A represents the casing of the controller or module proper. G G are guides in the top and bottom of the controller, respectively, and preferably situated at the center thereof. The stem I operates in the guides G G and has mounted upon it a disk D, situated within the chamber F, so as to reciprocate with the stem. The chamber F terminates within the controller in the cone-shaped funnel N. The stem I has a pin $p$ at its upper extremity, which operates in the slot $s$ at one extremity of the pivoted lever L. To the other end of this lever L is attached the rod R, operating at its lower end the crank C. V is a butterfly or other suitably-balanced valve mounted upon a shaft having its bearings in the walls of the pipe P and affixed to the crank C, so as to partially rotate, and thus open and close, in accordance with the reciprocating motion of the stem I. The weight $w$ is suspended by a rope $r$ or other suitable means from the segment $m$, attached to and movable with the lever L. B is a deflecting or baffling plate designed to quiet the water and reduce any currents, thereby giving a smooth entrance to the chamber F. Q indicates air-vents. X X indicate the height of the water in the controller-chamber at a given period.

Fig. 3 shows a form of apparatus through which the water flows either by gravity or pressure and in which the water is admitted to the module through the vertical pipe P. As in Fig. 1, the disk D is mounted upon the stem I, operating in the guides G G within the disk-chamber F. E is the outlet-pipe. Attached to the upper end of the stem I at $y$ is a link L, which is connected at its other end to the lug $u$, operating the valve V, situated in the pipe P. Also attached to the upper end of the stem I is a rope $r'$, fastened to the segment $t$. This segment $t$ is mounted upon a shaft having its bearings in the sides of the disk-chamber. To one of the outer ends of this shaft is attached the arm $a$, terminating at its outer extremity in the segment $m$. To this segment there is fastened the rope $r$, from which the weight $w$ is suspended.

In Fig. 2 our device is shown as arranged for a form of module through which the water passes under pressure. In this figure, as before, P is a pipe through which water is admitted to the module, and situated in this pipe is the butterfly-valve V, mounted upon a shaft and operated by the stem I through the rack and pinion L. The counterweight $w$ is attached to the rope $r$, secured to the segment $m$, which is mounted upon one end of the shaft of the valve V. D is a disk mounted upon the stem I, which operates, as above, in the guides G G. F is the disk-chamber, and E is the outlet-pipe.

Referring to Fig. 4, P is the inlet-pipe, in which is situated the butterfly-valve V, operated through the jointed lever L by the stem I reciprocating in the guides G G and having mounted upon it the disk D. The counterweight, arranged as shown, consists of a toothed segment $t$, gearing in a rack $r'$ upon the stem I, and a segment $m$, having the weight $w$ suspended therefrom by the rope $r$. These segments render the action of the counterweight upon the stem I constant. E is the outlet-pipe.

Fig. 5 shows another form of module also adapted for water under pressure, in which the difference in pressure on the two sides of the disk is counterbalanced by a weight. In Fig. 5 the valve V is situated downstream of the disk D, while the counterweight is situated between the valve V and the disk D, as shown. The device is otherwise substantially similar to that shown in Fig. 4.

In Fig. 6 is shown still another modification adapted for water under pressure. In this figure the valve V is shown downstream of the disk D and the counterweight is situated between the disk D and the valve V. The construction of this figure is very similar to that shown in Fig. 4 and will readily be understood from the drawings.

In the cases of Figs. 1 and 3 the counterweight balances the weight of the disk D, the stem I, and the weight or pressure of water on the upper side of the disk D. In the cases of Figs. 4, 5, and 6 the counterweight counterbalances the difference in the pressure on the opposite sides of the disk D, respectively, for a determined rate of discharge. In Fig. 2 the counterweight, with the disk and stem, balances the pressure on the disk.

The operation of our device is as follows: The filtered water enters the instrument through the pipe P, reaching the controller-chamber through the inlet-valve V. In the case of submerged discharge the valve V may be upstream or downstream from the disk. The water is discharged through the annular orifice between the disk D and the walls of the disk-chamber F. As with a uniform rate of discharge through the annular orifice, the disk-chamber F, having the same diameter throughout the path of travel of the disk D, the pressure on the disk will be constant. It is necessary that the movement of the counterbalancing-weight $w$ remain the same. Hence the weight is suspended from the segment $m$. The function of the butterfly-valve V is to regulate the inflow of water through the pipe P, and it acts in the following manner: With a given head or pressure on the surface of the filtering medium and free discharge from the filter the rate of discharge will vary with the condition of the filtering medium. For a given head or pressure on the surface, the rate of discharge being controlled by the module, the condition of the filtering medium will affect the pressure in the pipe P, the pressure being greater with a clean filter-bed than with a filter-bed clogged with coagalant and impurities. The area of the orifice and the weights and lever-arms are so adjusted that with the desired rate of discharge through the orifice the counterweight will be balanced. Suppose that this rate of discharge be established in the instrument. Now if the pressure in the pipe P be increased or the pressure back of the disk D be diminished the discharge will be increased. With increased discharge increased pressure ensues, overbalancing the opposing forces and moving the disk in the direction of the discharge. The movement of the disk and stem in the direction of the flow tends to close the butterfly-valve, thus throttling the discharge until the rate of flow is reduced and the forces acting on the disk are again balanced. Conversely a falling off in the rate of discharge, due to decrease of pressure in front of the instrument or increase of pressure back of the instrument, reduces the pressure on the disk D below that necessary to balance the weights. In this case the disk and stem are moved against the direction of the flow, the butterfly-valve V is opened, and throttling is reduced until equilibrium is again established through restoration of the desired rate of flow.

The rated capacity of discharge may be adjusted by altering the degree of submergence of the disk D by altering the counterweight or by changing the area of the annular orifice by substituting a larger or a smaller disk, as required. If there is a free discharge from the annular orifice into the atmosphere, it is necessary that air be freely admitted below the disk D, and this may be effected either wholly or in part from below, or the disk-stem may be made hollow, with vents Q below the disk, as illustrated in Fig. 1.

It may be added that instead of a single disk D, having a single sharp edge, we may use a disk which is made up of several disks, or it may have rounded edges; but in this latter case the discharge-orifice should be made smaller for the same rate of discharge by increasing the diameter of the disk. Further, the disk may be of any suitable form—square, oblong, or irregular—and the discharge-tube may of course be of any desired shape in cross-section, the fundamental idea being that the disk, and thereby the orifice, may traverse the disk-chamber F without friction or retardation of any kind and may keep the area between the disk and the walls of the chamber constant.

It is obvious that various modifications may be made in the apparatus without departing from our invention. Thus other forms of lever may be adopted for the levers shown, (the rack and pinion shown being an equivalent therefor,) and suitably-balanced valves may be substituted for the butterfly-valve V. Other devices may be used for the segments, and the location of the parts permits of some variation.

Having thus described our invention, what we claim is—

1. In a module, the combination of a balanced inlet-valve operated by a lever connected to a sliding stem traversing the controller-chamber, said stem having a submerged disk mounted thereon, and the pressure of the fluid on said disk being counterbalanced by a weight; and a discharge-tube, substantially as described.

2. In a module, the combination of an orifice traversing a tube through the movement of a submerged disk mounted upon a stem, said stem being connected to a jointed lever operating a balanced inlet-valve; the pressure of the fluid on said disk being counterbalanced by a weight, substantially as described.

3. In a module, the combination of an orifice traversing a tube through the movement of a submerged disk mounted upon a stem, said stem being connected to a jointed lever operating a balanced inlet-valve; the weight of said disk, stem, and the pressure of the fluid on said disk being counterbalanced by a weight, substantially as described.

4. In a module, the combination of an orifice traversing a tube through the movement of a submerged disk mounted upon a stem, said stem being connected to a jointed lever operating a balanced inlet-valve; the weight of said disk, stem, and the pressure of the fluid on said disk being counterbalanced by a weight; and a baffling-plate, substantially as described.

5. In a module, the combination of an orifice traversing a tube through the movement of a submerged disk mounted upon a stem, said stem being connected to a jointed lever operating a balanced inlet-valve; the weight of said disk, stem, and the pressure of the fluid on said disk being counterbalanced by a weight; a baffling-plate; and a funnel-shaped discharge-outlet, substantially as described.

EDMUND B. WESTON.
WALTER W. JACKSON.

Witnesses:
  GEO. H. REMINGTON,
  WM. R. DUTEMPLE.